United States Patent [19]
Triculis

[11] Patent Number: 5,395,451
[45] Date of Patent: Mar. 7, 1995

[54] PAINT TEMPERATURE CONTROL SYSTEM

[75] Inventor: Constantine Triculis, Bloomfield Hills, Mich.

[73] Assignee: Schmidt-Bretten, Inc., Detroit, Mich.

[21] Appl. No.: 68,553

[22] Filed: May 26, 1993

[51] Int. Cl.⁶ .................. B05B 1/24; F25B 29/00; G05D 23/00

[52] U.S. Cl. .................. 118/666; 118/602; 165/26; 165/30; 165/35; 239/135; 239/139

[58] Field of Search .............. 118/666, 602; 239/134, 239/135, 139; 165/26, 27, 30, 35; 427/422; 422/109

[56] References Cited

U.S. PATENT DOCUMENTS 3,590,914 7/1971 Duncan .............................. 165/30
3,880,228 4/1975 Houk et al. ....................... 165/30
4,984,628 1/1991 Uchida et al. .................... 165/30 X Primary Examiner—Robert J. Warden
Assistant Examiner—L. M. Crawford
Attorney, Agent, or Firm—Hardaway Law Firm, Charles L. Schwab

[57] ABSTRACT

A paint system for an automotive plant circulates various colors of paint, primers and seal coats in individual circulation loops to the many paint booths in an automotive finishing facility. A plate type heat exchanger is used for each circulation loop and the heat exchangers are connected in parallel in a single water circulation loop. The water is delivered to the plate type heat exchangers at a predetermined set point temperature and the plate type heat exchangers are sized to bring the paint to within 2° F. or less of the set point temperature by the close temperature approach of heat exchange.

4 Claims, 2 Drawing Sheets

PAINT TEMPERATURE CONTROL SYSTEM

TECHNICAL FIELD

An automotive painting system wherein each color paint or other finish is constantly circulated in a loop and delivered to the numerous spray stations at a predetermined temperature.

INFORMATION DISCLOSURE STATEMENT

The purpose of paint temperature control systems in automotive final assembly operations and similar manufacturing plants is to control the temperature of the paints or other finishes during application to the manufactured product. Currently, automotive paints and finishes are typically applied at a set point temperature between 80° F. and 95° F. The set point temperature depends on the recommendation of the paint manufacturer which is usually in the lower part of the mentioned range of 80° F. to 95° F. and the desired ease of application which calls for selecting a temperature in the upper end of the 80° F. to 95° F. temperature range. Once the set point temperature is selected, the control system is designed to deliver the paint to the spray stations at the set point temperature. In some prior art installations the delivered paint temperature varies plus or minus 2 or 3 degrees F. although the systems are designed to deliver paint at a predetermined set point temperature. This is believed to be due in part to inaccuracies in instrumentation and inherent response delays in the control systems used. In still other paint systems, the specified paint temperature variance may be ±1° F. It has been found that high maintenance costs are incurred in meeting these specifications after the system is used for a period of time substantially less than the expected life of the paint system.

In a typical automotive paint system, each color paint and other finish is constantly circulated in its own loop extending from the paint kitchen to the various spray booths and then back to the kitchen. Paint is constantly circulated in the loop by a pump when the automotive plant is in operation even though that color paint or finish may be used infrequently. When needed that color paint or finish is instantly available for application at the numerous spray booths at the correct application temperature. Most paint temperature control systems employ three subsystems, namely:

1) A paint temperature heat exchanger where paint or other finishes are heated or cooled to the set point temperature.
2) A heating water subsystem providing a constant source of hot water (typically 120° F. to 130° F.) to the paint temperature heat exchanger.
3) A cold water subsystem providing a constant source of cold water at an automatically controlled, predetermined temperature.

The hot water and cold water subsystems are connected to an automatic three way control valve at the paint temperature heat exchanger. A sensor in the paint outlet side of the paint temperature heat exchanger monitors the paint temperature and sends an electronic signal to a an electronic controller and the electronic controller delivers a signal to the automatic three way control valve which in turn admits either hot or cold water to the paint temperature heat exchanger. The control valve is of the modulating type and automatically regulates the volumetric flow of the hot or cold water to the paint heat exchanger. By controlling the volume of hot or cold water, the temperature of the paint exiting the paint heat exchanger is regulated to the desired set point. The automatic control valve allows either hot water or cold water to flow through it to the paint heat exchanger and modulates the flow of whichever of the two fluids is passing through the valve. Additionally automatically controlled solenoid valves are installed at the coolant outlet of the paint heat exchanger to return cold water to the cold water subsystem when cold water flows through the paint heat exchanger and to return hot water to the hot water subsystem when hot water circulates through the paint heat exchanger. One such prior art paint temperature control system is illustrated schematically in FIG. 1 of the drawings. A control system such as that illustrated is needed for each color paint and each primer and each clear coat used in the automotive finishing operation.

U.S. Pat. No. 3,880,228 discloses a heat exchanger for heating paint at the spray station en route to the atomizing disc by use of an oil heat exchanger arrangement including an oil heater and a cooling coil for the oil. Paint is circulated at ambient temperature and is heated only when passing from the circulation loop to the atomizing disc.

OBJECTS AND BRIEF SUMMARY OF THE INVENTION

It is a primary object of the invention to reduce the amount of equipment necessary to control the paint temperature. It is a further object of the invention to improve reliability while simplifying the paint temperature control system. A further object is to reduce the initial cost of control equipment, reduce cost of operation and maintenance with attendant reduction in cost of manufacturing the finished product.

Although paint manufacturers recommend slightly different application temperatures for their paint the automobile manufacturers generally use the same set point temperature for applying all finishes. Some finish manufacturers recommend application temperatures for clear coat finishes which are different than those for paint. Since the various color paints and finishes may leave the paint kitchen at different temperatures, the system must be capable of heating or cooling the paint, primer or clear coat to the set point temperature. The present invention utilizes plate type heat exchangers to which the liquid heat transfer medium (water) is delivered at the set point temperature. The plate type heat exchanger is provided with sufficient heat transfer surface area so that the water at set point temperature is capable of heating or cooling the paint, primer or clear coat finish very close to the set point temperature. This eliminates the need for both hot and cold water for the paint (cold water for cooling hot paint and hot water for heating cold paint). This invention capitalizes on the superior thermal transfer ability of the plate type heat exchanger to provide the paint at the desired outlet temperature for product application without the previously employed apparatus for delivering both hot and cold water to the paint heat exchanger and regulating the flow rate of the hot and cold water in response to paint output temperature. It has been found that a properly sized plate type heat exchanger with water as the heat exchange medium is capable of heating or cooling the incoming paint to within plus or minus 2° F. of the temperature of the water delivered to the heat exchanger. A plate type heat exchanger permits heat transfer at a temperature differential as low as 1° F., such a differential typically being achieved in multiple passes of the fluid through the unit.

In using the paint temperature control system of the present invention there is no danger of over heating the paint since the heat exchanger medium (water) is always delivered to the paint heat exchanger at the set point temperature. Although the paint heat exchanger of this invention requires more heat exchange surface area than previously used paint temperature control systems the additional heat exchanger cost is more than offset by the elimination of various components. For instance, the automatic modulation valve for each paint color is eliminated. There is no need for a paint temperature sensor for control of the modulation valve and there is no need for an electronic controller to operate the modulation valve. The piping and controls for hot and cold water are replaced by a single water supply at a set point temperature. There is no need for the solenoid valves for directing hot and cold water from the paint heat exchanger back to the hot and cold water sources.

This invention provides the user benefits of 1) lower capital costs, 2) reliable operation, 3) much lower maintenance cost, 4) less energy required in operation because the excess heat in one color paint can offset the cooling of the water in a parallel connected paint heat exchanger receiving under temperature paint, 5) reduced installation cost, 6) less floor space required and 7) substantial reduction in the danger of overheating the paint.

In a typical installation, the heat exchanger water flows through the paint heat exchanger at a constant rate and the only control required is for delivery of the water at the set point temperature.

DETAILED DESCRIPTION OF THE DRAWINGS

Figure 1:
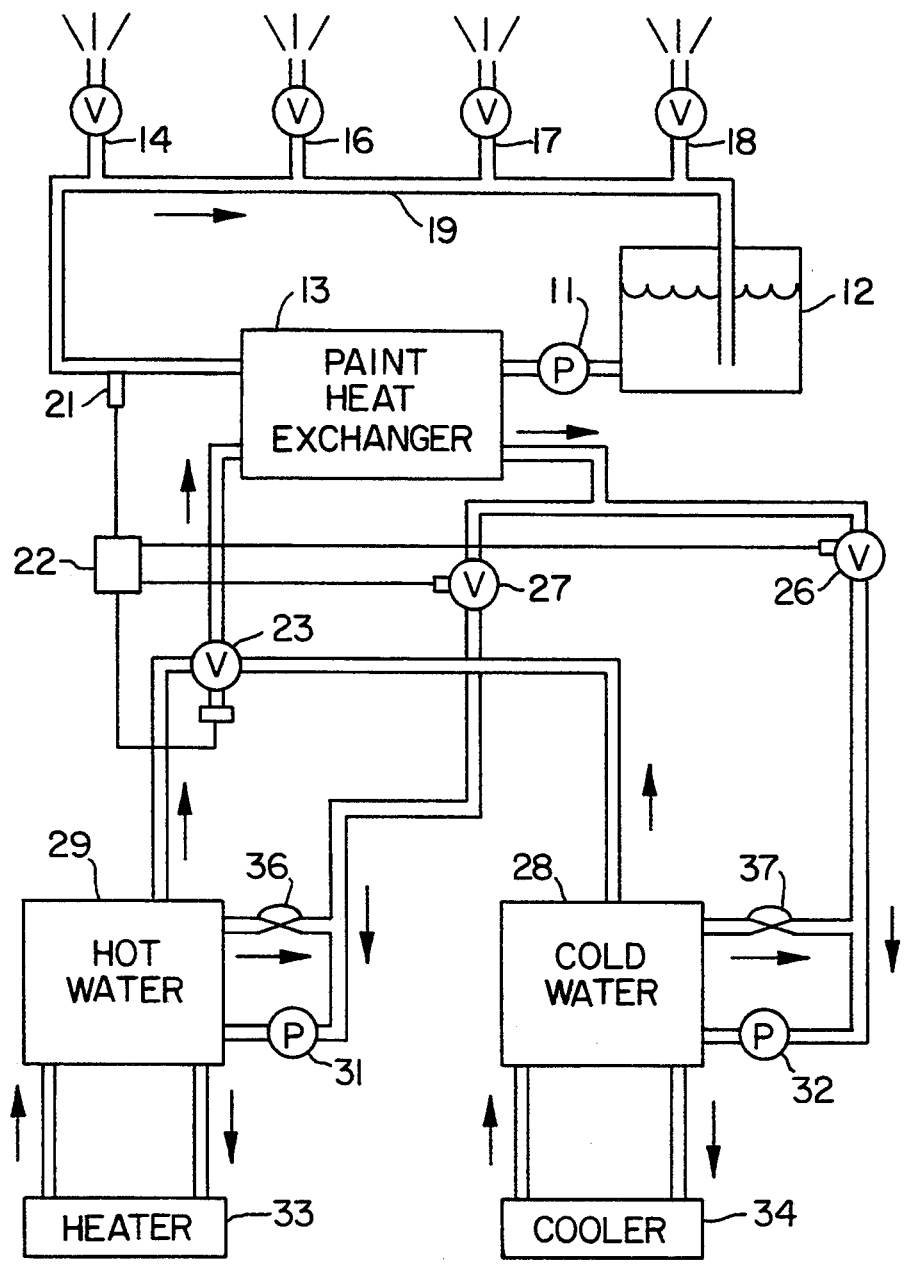
FIG. 1 is a schematic illustration of a prior art paint temperature control system.

Referring to the prior art paint temperature control system shown in FIG. 1, a single color paint is pumped by a pump 11 from a paint kitchen 12 through a paint heat exchanger 13 and thence through a loop conduit 19 to spray station conduits 14, 16, 17, 18 connected to the circulating loop conduit 19. A paint temperature sensor 21 monitors the temperature of the paint exiting the heat exchanger 13 and delivers an electronic signal to a temperature control device 22. The temperature control device operates a modulation flow control valve 23 which in turn modulates the flow of hot or cold water through the paint heat exchanger 13 depending on whether the paint is below or above the set point temperature. The temperature control device also operates a solenoid valve 26 to return cold water to the cold water supply tank 28 and operates a solenoid valve 27 to return hot water to the hot water supply tank 29. Pumps 31, 32 circulate the hot and cold water. Pressure relief valves 36, 37 permit circulation of hot and cold water, respectively, when flow to the paint heat exchanger drops to a predetermined extent. An appropriate heater 33 is provided for the hot water tank 29 and likewise an appropriate cooler 34 is provided for the cold water tank 28. An automotive plant may require as many as 40, or more, different finishes (different color paints, primers and seal coats). The prior art paint temperature control systems provide a system like that illustrated in FIG. 1 for each of the finishes. In other words 40, or more, such systems.

Figure 2:
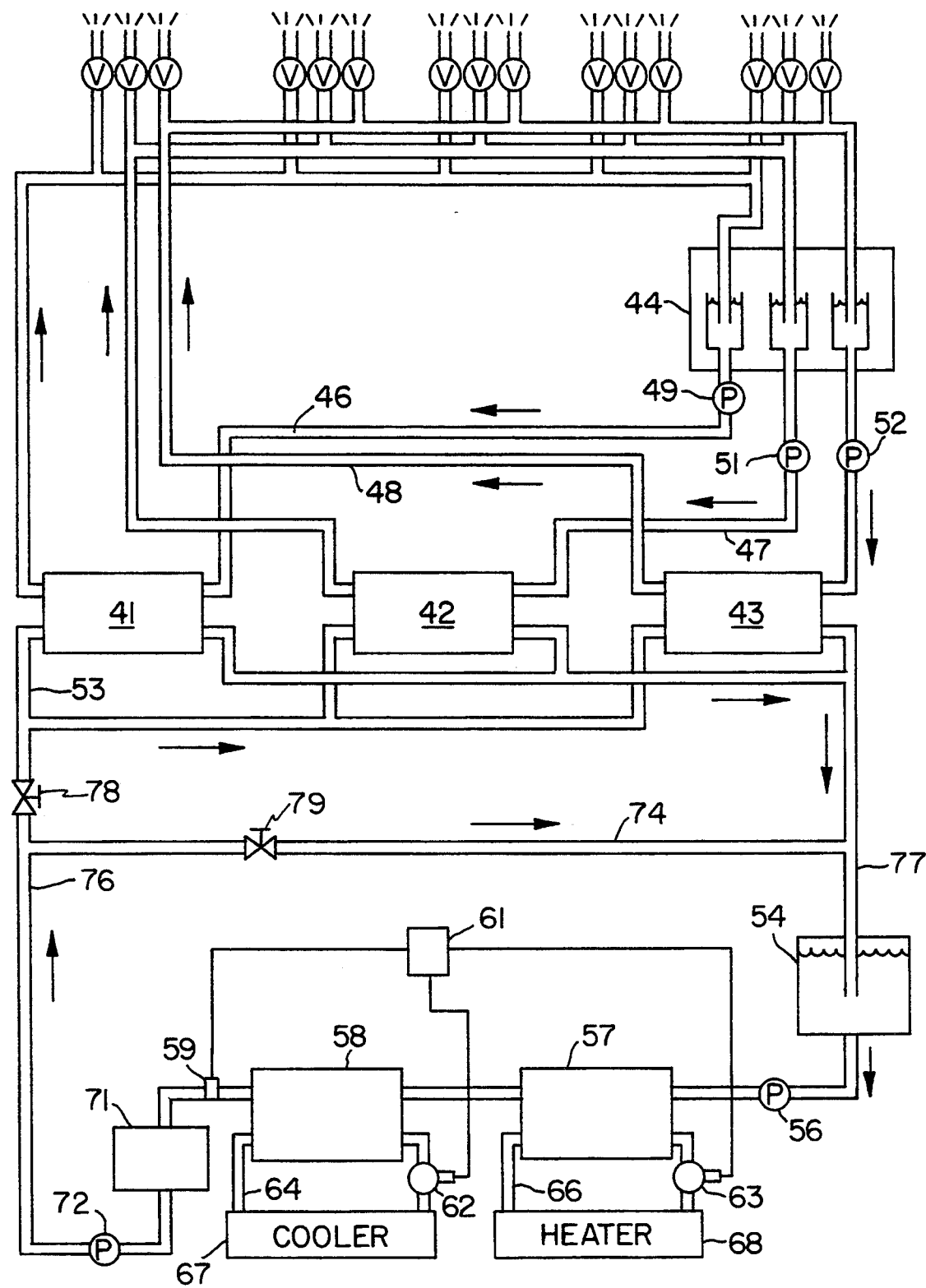
FIG. 2 is a schematic showing of the paint temperature control system of the present invention.

Referring to FIG. 2 one embodiment of the present invention is illustrated for use in an automotive finishing plant. Three paint heat exchangers 41, 42, 43 are shown for three different finishes which are stored in a paint kitchen 44. Each of the three different finishes has a circulation loop, namely conduits 46, 47, 48 and pumps 49, 51, 52. The pumps 49, 51, 52 draw the finishes from their individual storage tanks in the paint kitchen 44 and pump them through the plate type heat exchangers 41, 42, 43 and thence to the five paint stations. A single water cooling subsystem supplies a constant temperature heat exchange medium at a set point temperature (such as 92° F.) to all three plate type paint heat exchangers 41, 42, 43 which are connected in parallel in the water circuit 53. Although only 3 paint heat exchangers are illustrated it should be understood that all the paint, primer and seal coat heat exchangers can be connected in parallel in the single water circulation circuit 53. In other words, as many as 40, or more, parallel connected heat exchangers could be used in some paint temperature control systems used in automotive plants. The water circuit 53 includes a water storage tank 54, from which a pump 56 draws water and delivers it to series connected heating and cooling heat exchangers 57, 58. An electronic temperature sensor 59 monitors the temperature of water leaving the cooling heat exchanger 58 and is connected to a temperature indicator recorder controller 61. The controller 61 controls the flow of heating and cooling medium to the cooling heat exchanger 58 and heating heat exchanger 57 by activating electrically operated modulation valves 62, 63 in the circuits 64, 66 which include a cooler 67 and heater 68 for the cooling and heating the heat transfer medium used in the circuit 64, 66 respectively. Appropriate means such as pumps, not shown, are provided in the circuits 64, 66 to effect circulation of the heat transfer medium. Water at the set point temperature (such as 92° F.) is delivered to tank 71 from which a pump 72 draws water and delivers same to the parallel connected paint heat exchangers 41, 42, 43.

Each of the paint circulation loops 46, 47, 48 has an outlet in the form of a spray nozzle (or other finish applicator) at each of the spray stations or paint booths in the automotive finish plant. Appropriate flow control apparatus such as valves are provided at each of the five spray booths in the illustrated system. The paint, primer or seal coat finish in the circulation loops 46, 47, 48 are circulated by the pumps 49, 51, 52 to and from individual storage tanks in the paint kitchen 44 and additional paint, primer or seal coat finish is added to the tanks as needed.

The plate type heat exchangers 41, 42, 43 have sufficient heat transfer surface area to insure bringing the paint to the set point temperature (within plus or minus 2° F.). If the paint enters the heat exchanger too hot the plate type heat exchanger will cool it and if the paint enters the heat exchanger too cold the heat exchanger will warm it. In either case the plate type heat exchanger is sized to bring the temperature very close to the temperature of the cooling water which is supplied to the heat exchangers at the set point temperature. In normal operating conditions it is expected that a single pass through the heat exchanger will bring the paint to ±2° F. of the set point temperature, however, in extreme temperature operating conditions such as at start up with unusually hot or cold paint, several passes through the heat exchanger may be required to come within 2° F. of the set point temperature.

In order to assist in heating or cooling the paint when the system is required to condition exceptionally hot or cold paint, such as might occur upon addition of substantial quantities of hot or cold paint to the storage vessels in the paint kitchen 44, I provide a temperature modulating water circulation system. The modulating water circulation system includes a bypass conduit 74 interconnecting pump output conduit 76 and return conduit 77 of circuit 53. Flow to the heat exchangers 41, 42, 43 and through the bypass conduit 74 is proportioned by hand valves 78, 79. The system is sized to permit some flow of water from the pump 72 through the bypass. The bypass flow, which may be 65%, or more, of the pump output, combines with water returned from the paint heat exchangers and serves to moderate the temperature of the water passing to the water heat exchangers 57, 58. This helps the system handle unusual heat exchange loads.

The embodiments of the invention in which an exclusive property or privilege is claimed are defined as follows:

1. A paint temperature control system for a product finishing plant comprising:
   a plurality of finish application booths at which a plurality of finishes are selectively applied to products being finished,
   a kitchen having a plurality of storage vessels containing a plurality of liquid finishes,
   conduit means forming a circulation loop for each said finish, extending from said kitchen to said application booths and back to said kitchen,
   a plate type heat exchanger in each of said circulation loops,
   a pump in each of said circulation loops operable to circulate each of said finishes from its associated storage vessel through its associated plate heat exchanger and through said plurality of finish application booths and back to its associated storage vessel, and
   a water coolant subsystem including
      conduit means connecting said plurality of plate type heat exchangers in parallel relationship to one another and defining a circulation path,
      a water pump operable to circulate water in said circulation path and
      temperature control means in said circulation path maintaining the temperature of water delivered to said plate type heat exchangers at a set point temperature, said plate type heat exchangers having sufficient heat transfer surface area to maintain the temperature of said finish delivered to said application booth in the range of plus or minus 2° F. of said set point temperature.

2. The paint temperature control system of claim 1 wherein said temperature control means include a cooling heat exchanger and a heating heat exchanger in said circulation path, a cold water supply for said cooling heat exchanger, a hot water supply for said heating heat exchanger and automatic flow control means controlling the flow of water in said cold and hot water supplies to keep the temperature of the water delivered to said plate type heat exchangers at said set point temperature.

3. The paint temperature control system of claim 2 wherein said automatic flow control means includes electronically operated valves in said hot and cold water supplies and a temperature indicator recorder controller monitoring the temperature of water in said circulation path and controlling the operation of said electronically operated valves.

4. The paint temperature control system of claim 2 and further comprising a bypass conduit bypassing a portion of the flow from said water pump around said paint heat exchangers and combining the bypassed water with water returning to said water pump from said plate type heat exchangers at a point upstream of said heating and cooling heat exchangers.

* * * * *